United States Patent [19]

Gibson

[11] 4,353,596
[45] Oct. 12, 1982

[54] BREAK DOWN DUMPING CART

[76] Inventor: Calvin Gibson, 111 Daphney Way, E. Palo Alto, Calif. 94303

[21] Appl. No.: 180,687

[22] Filed: Aug. 25, 1980

[51] Int. Cl.³ .............................................. B62B 1/24
[52] U.S. Cl. ...................................... 298/2; 206/223; 206/577; 280/47.26; 280/659; 298/5
[58] Field of Search .................. 298/2, 3, 5; 206/223, 206/335, 577; 280/37, 47.26, 651–659, 47.31

[56] References Cited
U.S. PATENT DOCUMENTS

| 577,169 | 2/1897 | Moberly et al. | 298/5 |
| 1,409,787 | 3/1922 | Scarlett | 280/37 |
| 2,742,300 | 4/1956 | Carver | 280/47.31 |
| 2,903,270 | 9/1959 | Ross | 298/2 X |
| 3,178,228 | 4/1965 | Gibson et al. | 298/5 X |
| 4,190,260 | 2/1980 | Pearce | 280/47.31 |

FOREIGN PATENT DOCUMENTS

| 67531 | 8/1948 | Denmark | 298/2 |
| 1044471 | 6/1953 | France | 280/47.26 |

Primary Examiner—Leslie J. Paperner
Attorney, Agent, or Firm—Paul L. Hickman

[57] ABSTRACT

A break down dumping cart is disclosed including a hopper and a support structure which operably supports the hopper and which can be disassembled and stored within the hopper for compact storage and shipping. The support structure includes a pair of side frame members and a number of associated bracing members which cooperate to bracket the hopper on three of its sides, pivotal support members attaching one of the side frame members to the hopper, pivotal over center lever members attaching the other side frame member to the hopper, an axle and wheel assembly attached to a lower section of the side frame members, and a pair of handle members attached to an rearwardly extending from respective ones of the side frame members.

8 Claims, 3 Drawing Figures

BREAK DOWN DUMPING CART

BACKGROUND OF THE INVENTION

1. Field of the Invention

This invention relates generally to wheeled carriers, and more particularly to two wheeled dumping carts.

2. Description of the Prior Art

Two wheeled dumping carts are known in the prior art. For example, in U.S. Pat. No. 3,178,228 of C. Gibson et al a dumping hand cart is disclosed including a three sided frame pivotally supporting a hopper, a wheel and axle assembly mounted to the frame, a semi-circular handle rigidly attached to the frame, and a rather complex over center link and lever assembly for controlling the dumping action of the hopper.

While the cart of Gibson et al is efficient to use, it is not as correspondingly efficient to store or to ship. The frame, handle, link and lever assembly, and wheel assembly are all either permanently or semi-permanently attached together and thus cannot be easily removed to make the dumping cart more compact. Furthermore, even if Gibson's cart could be disassembled its component members would be too large to fit within the cart's hopper and thus would have to be stored separately. Also, the number of members to the link and lever assembly would tend to indicate that Gibson had not contemplated a disassemblable dumping cart.

What the prior art fails to disclose, then, is a dumping cart that can be easily broken down to its component members so that it may be compactly stored and shipped.

SUMMARY OF THE INVENTION

It is an object of this invention to provide a dumping cart that is easily stored and shipped.

It is another object of this invention to provide such a cart which further can be quickly and easily broken down into its component members, and where the component members are small enough to be stored within the hopper of the cart.

A still further object of this invention is to provide a cart as described above which requires as few component members as necessary to accomplish the above objects.

Briefly, the invention includes a hopper and a break down support structure which, when assembled, pivotally supports the hopper and which, when disassembled, fits completely within the hopper. The assembled support structure includes a pair of spaced apart, generally triangular side frame members, an axle member coupled between the lower, forward sections of the side frame members, a pair of wheel members attached to opposite ends of the axle, pivotal over center lever members coupled between a side wall of the hopper and one of the side frame members, pivotal support members coupled between another side wall of the hopper and the other side frame member, a pair of handle members rearwardly extending from upper sections of the side wall portions, and bracing members attaching the handle members and the side frame members together.

Each of the above members of the support structure is removably attached to another member or to the hopper so that the support structure can be quickly broken down into its component parts. The individual members are further designed to be no larger than the maximum internal dimension of the hopper so that they can be simultaneously stored therein.

An advantage of this invention is that the cart, when broken down as described above, is more easily stored and shipped than the dumping hand carts of the prior art.

A further advantage of this invention is that the cart can be quickly and easily broken down into its component members.

Yet another advantage of this invention is that the cart uses as few members as necessary to accomplish the above objects. For example, the device of Gibson et al, which was described earlier, uses no less than 5 lever members to control the dumping action of the hopper, while the device of the present invention uses only 2 lever arms for the same purpose.

These and other objects and advantages of the present invention will no doubt become apparent upon a reading of the following descriptions and a study of the several figures of the drawing.

IN THE DRAWING

DETAILED DESCRIPTION OF THE PREFERRED EMBODIMENT

Figure 1:
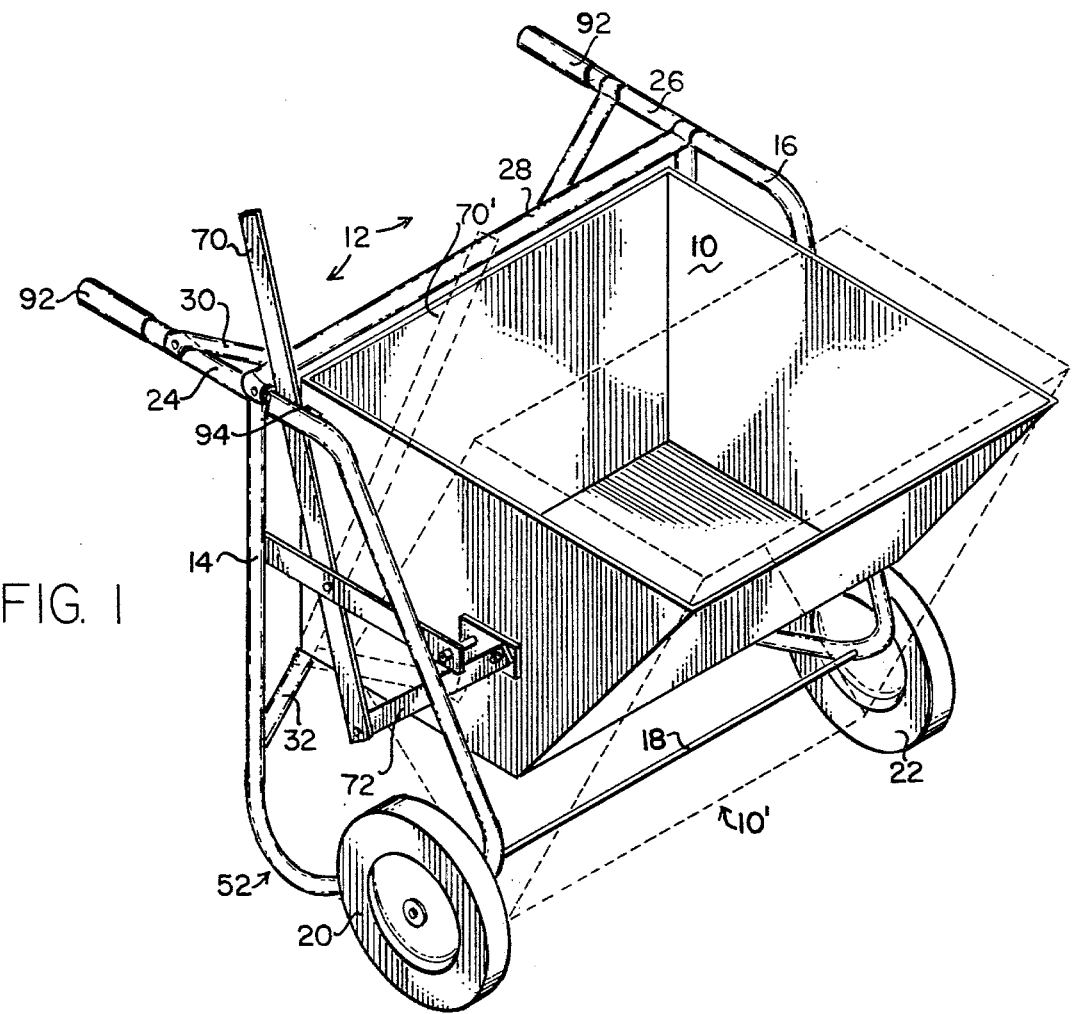
FIG. 1 is a perspective view of a break down dumping cart in accordance with the present invention.

Referring generally to the figures, wherein like numerals refer to like components, a break down dumping cart in accordance with the present invention includes a hopper 10, and a support structure 12 including a first side frame member 14, a second side frame member 16, an axle 18, a pair of wheels 20 and 22 attached to opposite ends of the axle, handle members 24 and 26 attached to the side frame members, three bracing members 28, 30 and 32, a pivotal over center assembly 34, and a pivotal support assembly 36. The various members are attached together with removable fasteners such as sheet metal screws and/or nuts and bolts.

The hopper 10, which is preferably constructed from a heavy sheet metal material, includes a bottom portion 38, a pair of opposing side wall portions 40 and 42, a rear wall portion 44 and a front wall portion 46. Wall portions 40, 42 and 44 rise substantially perpendicularly from the bottom portion 38, while front wall portion 46 rises from the bottom portion at an obtuse angle. The bottom portion and the four wall portions surround and define the containment volume of the hopper. The maximum dimension of this containment volume is equal to the distance from the upper juncture of wall 40 and 46 (as seen at 'A' in FIG. 2) and the lower juncture of walls 42 and 44 (as seen at 'B' in FIG. 2). All of the members of the support structure are designed to be smaller than this maximum dimension so that they can fit within the containment volume.

Side frame members 14 and 16 are similar, substantially triangular structures having an upper corner 48, a lower, forward corner 50 and a lower, rearward corner 52. The frame members are preferably made from bent tubular stock. An end 54 of the stock extends towards the back of the cart and the other end 56 of the stock attaches to the stock to form corner 48. Corner 52 is lower than corner 50 by approximately the radius of the wheel members.

Attached to the frame member 14 is a first support bar member 58 and attached to frame member 16 is a second support bar member 60. The support bar members 58 and 60 are provided with journal bearings 62 and 64, respectively.

Support bar member 60, journal bearing 64, and a pintle 66 attached to sidewall portion 42 by a reinforcement plate 68 define the previously mentioned pivotal support assembly 36. Pintle 66 engages bearing 64 as shown at 69 to pivotally support the left side of the hopper.

Besides support bar member 58 and journal bearing 62 the pivotal over center assembly 34 includes an actuator member 70, a linkage member 72, a pintle 74, a stud 76, and a reinforcement plate 78. The reinforcement plate is attached to the right sidewall portion 40 and pintle 74 and stud 76 are attached to the plate. Pintle 76 pivotally engages bearing 62 as indicated at 79 and stud 76 is pivotally attached to an end of linkage member 72 as shown at 80. The other end of the linkage member is pivotally attached to the lower end of the actuator member 70, as shown at 82. Member 70 is further pivotally attached to the support member 58 as shown at 84.

Axle 18 is rotatably coupled to the lower, forward corners of the side frame members and the wheels 20 and 22 are attached to its ends by cap nuts 86 and 88, respectively. The axle is provided with retainers 90 to prevent axial motion. The axle may be alternatively coupled to the side frame members by a pair of journal bearings attached beneath the front, lower corners of those members.

Handle members 24 and 26 are preferably of tubular stock and are adapted to telescopically attach over the ends 54 of the side frame members. In the illustrated embodiment the handle members are provided with optional handgrips 92.

Bracing member 28 attaches over the ends 56 of the side frame members, coupling them together. Bracing member 30 attaches to handle member 24 at one end and to side frame member 16 at its other end. Side frame member 32 crosses member 32 and attaches at one end to handle member 26 and attaches at its other end to side frame member 14. Like the side frame members, the bracing members are preferably made from tubular stock and have their ends formed to facilitate their attachment to the side frame members and the handle members.

The use of the present device is best discussed with reference to FIG. 1. At rest the rear, lower corners 52 of the side frame members and the wheels 20 and 22 cooperate to provide a four-point ground contact for the cart. To move the cart the handgrips are grasped and the corners 52 of the side frame members are cleared of the ground so that the cart can roll freely on its wheels. To dump the contents of the cart actuator member 70 is freed of a safety stop 94 and pushed forwardly as shown at 70'. This forward movement of the actuator member is transmitted to the hopper by the linkage member 72 to cause the hopper to pivot forwardly as shown at 10'.

Figure 3:
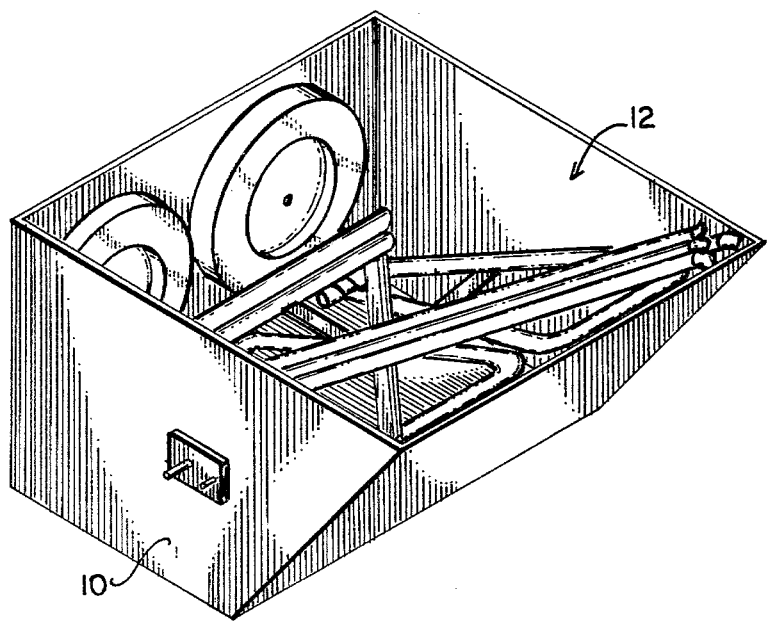
FIG. 3 is a perspective view of the cart shown in FIG. 1 after it has been disassembled and its component members stored.
Figure 2:
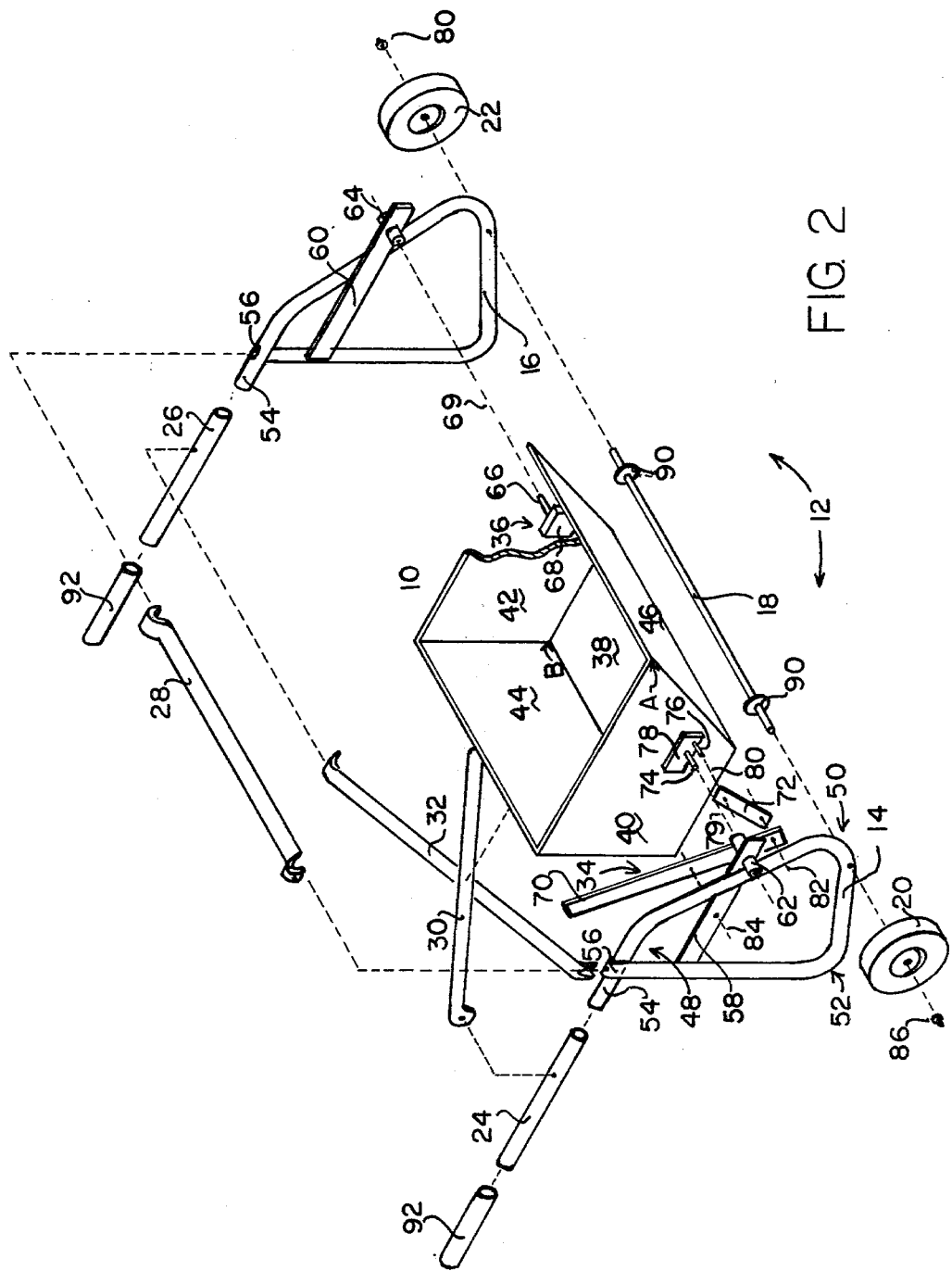
FIG. 2 is an exploded view of the cart shown in FIG. 1.

When the cart is to be compactly shipped or stored it is broken down as indicated in FIG. 2 and the individual members of the support structure 12 are stored within hopper 10, as illustrated in FIG. 3. As shown, the reinforcement plates and pintles may be permanently attached to the side wall portions of the hopper, but they also may be alternatively removably attached thereto so that they too may be stored within the hopper.

While this invention has been described in terms of a single preferred embodiment, it is contemplated that various modifications and permutations thereof will become apparent to those reading the preceding descriptions and studying the drawing. It is therefore intended that the following appended claims be interpreted as including all such modifications and permutations as fall within the true spirit and scope od the present invention.

What is claimed is:

1. A break down dumping cart comprising:
   hopper means having a bottom portion, a rear wall portion and a pair of opposing side wall portions rising substantially perpendicularly from said bottom portion, and a front wall portion rising obtusely from said bottom portion, said portions defining a containment volume having a fixed maximum dimension; and
   support structure means having a plurality of members each of which has dimensions less than said maximum dimension, said support structure including
   a pair of spaced apart, generally triangular side frame members having an upper corner, a lower, forward corner and a lower, rearward corner, each side frame member being operably juxtapositioned with one of said side wall portions,
   an axle removably coupled between said lower, forward corners of said side frame members,
   a pair of wheels removably attached to opposite ends of said axle,
   over center support means pivotally coupling said first side frame member to a first side wall portion and said second side frame member to a second side wall portion,
   an actuating mechanism for selectively moving said hopper means between a dumping position and an over center non-dumping position, said actuating mechanism including a first support bar attached to said first side frame member, an elongated actuating lever having a mid-length portion pivotally coupled to said first support bar, and a link having a first end pivotally attached to a first end of said actuating lever and a second end pivotally attached to said first side wall portion, such that forward movement of a second end of said actuating lever causes said hopper means to move forwardly to said dumping postion, and rearward movement of said second end of said actuating lever causes said hopper means to move rearwardly to said over center, non-dumping position;
   a pair of handle members each removably attached to one of said side frame members, and
   bracing means removably attached between said side frame members,
   whereby when said dumping cart is dis-assembled said members can be simultaneously stored within the containment volume of said hopper means.

2. A break down dumping cart as claimed in claim 1 further comprising second bracing means removably attached between a first handle member and said first side frame member, and third bracing means removably attached between a second handle member and said second side frame member.

3. A break down dumping cart as claimed in claim 2 wherein said over center support means include a second support bar member attached to said second side frame member.

4. A break down dumping cart as claimed in claim 3 further comprising a pair of pintles each of which is coupled to one of said side wall portions, where a first pintle is removably engagable with said first support bar member and a second pintle is removably engagable with said second support bar member.

5. A break down dumping cart as claimed in claim 4 wherein said first support bar member and said second support bar member are each provided with a journal bearing engagable with said first pintle and said second pintle, respectively.

6. A break down dumping cart as claimed in claim 5 wherein said first pintle extends outwardly from a first reinforcement plate that is attached to said first side wall portion and wherein said second pintle extends outwardly from a second reinforcement plate that is attached to said second side wall portion, said first reinforcement plate further having an outwardly projecting stud for pivotal attachment to said second end of said link.

7. A break down dumping cart as claimed in claim 6 wherein said side frame members and said handle members are at least partially of tubular construction, and wherein portions of said side frame members rearwardly extending from said upper corners are telescopically attachable to said handle members.

8. A break down dumping cart as claimed in claim 7 wherein said lower, rearward corner of said side frame members is lower than the lower, forward corner of said side frame members by approximately the radius of said wheel members, whereby said lower, rearward corners cooperate with said wheel members as ground engaging supports when the cart is immobile.

* * * * *